US00RE49227E

(19) United States
(12) Reissued Patent
Peron

(10) Patent Number: US RE49,227 E
(45) Date of Reissued Patent: Oct. 4, 2022

(54) MEDICAL DRESSING

(71) Applicant: Smith & Nephew PLC, Watford (GB)

(72) Inventor: Yannick Louis Peron, East Yorkshire (GB)

(73) Assignee: Smith & Nephew PLC, Watford (GB)

(21) Appl. No.: 29/709,413

(22) Filed: Mar. 19, 2020

Related U.S. Patent Documents

Reissue of:

(64) Patent No.: Des. 679,820
Issued: Apr. 9, 2013
Appl. No.: 29/389,783
Filed: Apr. 15, 2011

U.S. Applications:

(60) Continuation of application No. 29/639,290, filed on Mar. 5, 2018, now Pat. No. Re. 47,645, which is a continuation of application No. 29/548,270, filed on Dec. 11, 2015, now Pat. No. Re. 46,778, which is a division of application No. 29/510,717, filed on Dec. 2, 2014, now Pat. No. Re. 46,289, which is an application for the reissue of Pat. No. Des. 679,820.

(30) Foreign Application Priority Data

Oct. 15, 2010 (GB) ..... 4017442
Oct. 15, 2010 (GB) ..... 4017443

(51) LOC (13) Cl. ..... 24-04

(52) U.S. Cl.
USPC ..... D24/184

(58) Field of Classification Search
USPC ..... D24/189
CPC ..... A61F 13/02; A61M 1/009; A61M 27/00; A61M 1/0088
See application file for complete search history.

(56) References Cited

U.S. PATENT DOCUMENTS 1,066,934 A 7/1913 Manney
2,613,696 A * 10/1952 MacIntyre ..... 139/418
2,682,873 A 7/1954 Evans et al.
3,342,183 A * 9/1967 Edenbaum ..... 604/307
3,568,675 A 3/1971 Harvey
D235,737 S 7/1975 Paone et al.
D240,199 S 6/1976 Perfect
4,219,019 A 8/1980 Coates
4,228,798 A 10/1980 Deaton
4,252,119 A 2/1981 Coates
4,341,207 A 7/1982 Steer et al.
4,360,015 A 11/1982 Mayer
4,360,021 A 11/1982 Stima
D267,510 S * 1/1983 Golub ..... D24/189
4,499,896 A 2/1985 Heinecke
4,561,435 A 12/1985 McKnight et al.
4,564,010 A * 1/1986 Coughlan et al. ..... 604/307
4,587,146 A * 5/1986 Anhauser et al. ..... 428/42.2
4,627,429 A * 12/1986 Tsuk ..... 604/307
4,699,134 A 10/1987 Samuelsen
D292,826 S * 11/1987 Sproles ..... D24/189
4,759,354 A 7/1988 Quarfoot
4,798,603 A 1/1989 Meyer et al.
4,808,172 A * 2/1989 Murata ..... 604/306
4,867,150 A 9/1989 Gilbert
4,872,450 A 10/1989 Austad
4,875,473 A 10/1989 Alvarez
4,882,213 A 11/1989 Gaddis et al.
4,917,112 A * 4/1990 Kalt ..... A61F 13/023 128/888
4,969,880 A 11/1990 Zamierowski
4,972,829 A 11/1990 Knerr
4,997,425 A 3/1991 Shioya et al.
5,052,381 A * 10/1991 Gilbert et al. ..... 602/52
5,056,510 A * 10/1991 Gilman ..... 602/52
5,080,661 A 1/1992 Lavender et al.
5,134,994 A 8/1992 Say
5,149,331 A 9/1992 Ferdman et al.
5,152,757 A 10/1992 Eriksson
5,176,663 A 1/1993 Svedman et al.
5,218,973 A 6/1993 Weaver et al.
5,261,893 A 11/1993 Zamierowski
5,264,218 A 11/1993 Rogozinski
5,266,371 A * 11/1993 Sugii et al. ..... 428/41.5
5,322,695 A 6/1994 Shah et al.

(New)

5,336,209 A 8/1994 Porzilli
D352,463 S 11/1994 Kubo
D352,782 S * 11/1994 Kirk et al. ..... D24/189
D357,742 S * 4/1995 Peery et al. ..... D24/189
5,437,651 A 8/1995 Todd et al.
5,445,604 A 8/1995 Lang
D362,505 S * 9/1995 Fabricant ..... D24/189
5,486,158 A 1/1996 Samuelson
5,496,605 A 3/1996 Augst et al.
D369,907 S * 5/1996 Sayovitz et al. ..... D5/53
D370,127 S * 5/1996 Bonaddio et al. ..... D5/58
5,527,293 A 6/1996 Zamierowski
D372,098 S * 7/1996 Lattin et al. ..... D24/189
5,549,584 A 8/1996 Gross
5,593,395 A 1/1997 Martz
5,599,289 A 2/1997 Castellana
5,616,387 A 4/1997 Augst et al.
5,624,423 A 4/1997 Anjur et al.
5,633,007 A 5/1997 Webb et al.
5,636,643 A 6/1997 Argenta et al.
5,645,081 A 7/1997 Argenta et al.
D382,343 S * 8/1997 Wandell et al. ..... D24/189
D384,745 S * 10/1997 Lattin et al. ..... D24/189
D385,038 S * 10/1997 Shultz ..... D24/189
5,681,579 A 10/1997 Freeman
D389,581 S * 1/1998 Fein ..... D24/189
5,713,881 A 2/1998 Rezai et al.
5,714,225 A 2/1998 Hansen et al.
5,733,305 A 3/1998 Fleischmann
D393,591 S 4/1998 Baryshyan
5,759,570 A 6/1998 Arnold
D396,954 S 8/1998 Iversen et al.
D396,955 S 8/1998 Iversen et al.
D396,956 S 8/1998 Iversen et al.
5,792,090 A 8/1998 Ladin
5,810,755 A 9/1998 LeVeen et al.
D400,249 S 10/1998 Holubar et al.
D403,774 S 1/1999 Laughlin et al.
D406,899 S 3/1999 Cottle
5,885,237 A 3/1999 Kadash et al.
D408,625 S 4/1999 Barker
D408,920 S 4/1999 Dunshee et al.
5,899,893 A 5/1999 Dyer et al.
5,928,265 A 7/1999 Fleischmann
5,958,420 A 9/1999 Jenson
D414,925 S 10/1999 Holland
D415,836 S 10/1999 Dunshee et al.
5,964,723 A 10/1999 Augustine
5,981,822 A 11/1999 Addison
5,985,990 A 11/1999 Kantner et al.
5,998,694 A * 12/1999 Jensen et al. ..... 602/57
6,010,527 A 1/2000 Augustine et al.
6,011,194 A 1/2000 Buglino et al.
D423,102 S 4/2000 Mertenant
D424,699 S * 5/2000 Allen ..... D24/189
6,071,267 A 6/2000 Zamierowski
6,087,549 A 7/2000 Flick
6,117,111 A 9/2000 Fleischmann
6,136,796 A 10/2000 Kozak
D434,150 S 11/2000 Tumey et al.
6,142,982 A 11/2000 Hunt et al.
D439,341 S 3/2001 Tumey et al.
6,203,563 B1 3/2001 Fernandez
6,255,552 B1 7/2001 Cummings et al.
6,291,050 B1 9/2001 Cree et al.
6,293,281 B1 9/2001 Shultz et al.
D449,891 S 10/2001 Moro
6,345,623 B1 2/2002 Heaton et al.
6,350,339 B1 2/2002 Sessions
D456,514 S 4/2002 Brown et al.
D459,078 S 6/2002 Tondino
6,398,767 B1 6/2002 Fleischmann
6,458,109 B1 10/2002 Henley et al.
6,468,199 B1 10/2002 Satou et al.
D469,176 S 1/2003 Hall et al.
6,553,998 B2 4/2003 Heaton et al.
D475,132 S 5/2003 Randolph
D475,454 S 6/2003 Gillespie et al.
D477,086 S * 7/2003 Tsuruda et al. ..... D24/189
D481,459 S 10/2003 Nahm
6,648,862 B2 11/2003 Watson
6,680,113 B1 1/2004 Lucast et al.
6,685,681 B2 2/2004 Lockwood et al.
6,752,794 B2 6/2004 Lockwood et al.
6,755,807 B2 6/2004 Risk et al.
D495,056 S * 8/2004 Watanabe ..... D24/189
6,794,554 B2 9/2004 Sessions et al.
6,797,855 B2 9/2004 Worthley
6,814,079 B2 11/2004 Heaton et al.
6,838,589 B2 1/2005 Liedtke et al.
6,855,135 B2 2/2005 Lockwood et al.
D504,953 S 5/2005 Ryan
D506,547 S 6/2005 Cruz et al.
6,936,037 B2 8/2005 Bubb et al.
D509,299 S * 9/2005 Watanabe ..... D24/189
6,951,553 B2 10/2005 Bubb et al.
6,974,428 B2 12/2005 Knutson et al.
D516,217 S 2/2006 Brown et al.
7,004,915 B2 2/2006 Boynton et al.
7,005,556 B1 2/2006 Becker et al.
7,030,288 B2 4/2006 Liedtke et al.
7,041,868 B2 5/2006 Greene et al.
D522,657 S 6/2006 Murphy et al.
7,108,683 B2 9/2006 Zamierowski
7,137,968 B1 11/2006 Burrell et al.
D537,944 S 3/2007 Eda et al.
D537,948 S 3/2007 Smith
7,195,624 B2 3/2007 Lockwood et al.
D543,691 S 6/2007 Payne et al.
D544,092 S 6/2007 Lewis
D544,607 S 6/2007 Henry et al.
D545,055 S 6/2007 Lieberman et al.
D546,952 S 7/2007 May
D548,347 S 8/2007 Ichino et al.
D548,954 S 8/2007 Andersen et al.
D551,769 S 9/2007 Skwarek et al.
D554,266 S 10/2007 Striepe et al.
7,288,745 B2 10/2007 Colonna
7,291,762 B2 11/2007 Flick
D556,444 S 12/2007 Ipsen et al.
7,317,954 B2 1/2008 McGreevy
7,335,809 B2 2/2008 Riesinger
7,338,482 B2 3/2008 Lockwood et al.
D571,922 S * 6/2008 Freeland ..... D24/189
7,381,859 B2 6/2008 Hunt et al.
D572,367 S * 7/2008 Freeland ..... D24/189
D572,588 S 7/2008 Osborn et al.
D572,824 S * 7/2008 Propp ..... D24/189
D572,825 S * 7/2008 Freeland ..... D24/189
7,401,703 B2 7/2008 McMichael et al.
7,438,705 B2 10/2008 Karpowicz et al.
D580,285 S 11/2008 Hendrickson et al.
D585,135 S 1/2009 Mori et al.
D585,137 S 1/2009 Onoda et al.
D585,543 S 1/2009 Yodfat et al.
D586,466 S 2/2009 Smith et al.
D587,376 S 2/2009 Takano et al.
D587,901 S 3/2009 Pidgeon et al.
D588,160 S 3/2009 Beale et al.
D589,798 S 4/2009 Liipola
D590,841 S 4/2009 Muhlenberend
7,518,031 B2 4/2009 Liedtke et al.
7,531,711 B2 5/2009 Sigurjonsson et al.
D594,114 S 6/2009 Locke et al.
D596,030 S 7/2009 Liipola
D598,472 S 8/2009 Andersen et al.
7,569,742 B2 8/2009 Haggstrom et al.
D600,354 S * 9/2009 Sachi ..... D24/189
D601,692 S 10/2009 Tout et al.
D602,284 S 10/2009 Pidgeon et al.
D602,582 S 10/2009 Pidgeon et al.
D602,583 S 10/2009 Pidgeon et al.
D602,584 S 10/2009 Pidgeon et al.
D604,424 S * 11/2009 Coubetergues ..... D24/189
7,611,500 B1 11/2009 Lina et al.
7,615,036 B2 11/2009 Joshi et al.
D605,299 S * 12/2009 Iwahashi et al. ..... D24/189
D607,202 S 1/2010 Pidgeon et al.

7,645,269 B2 1/2010 Zamierowski
D609,922 S * 2/2010 Bridges et al. ..... D5/53
7,717,313 B2 5/2010 Criscuolo et al.
7,722,582 B2 5/2010 Lina et al.
D616,980 S 6/2010 MacDonald et al.
D617,094 S 6/2010 Pidgeon et al.
D618,810 S * 6/2010 Tanigawa et al. ..... D24/189
7,745,681 B1 6/2010 Ferguson
D620,122 S * 7/2010 Cotton ..... D24/189
D620,123 S * 7/2010 Igwebuike ..... D24/189
7,754,937 B2 7/2010 Boehringer et al.
7,758,554 B2 7/2010 Lina et al.
7,759,537 B2 7/2010 Bishop et al.
7,759,538 B2 7/2010 Fleischmann
7,759,539 B2 7/2010 Shaw et al.
7,763,769 B2 7/2010 Johnson et al.
7,775,998 B2 8/2010 Riesinger
7,776,028 B2 8/2010 Miller et al.
7,779,625 B2 8/2010 Joshi et al.
7,790,945 B1 9/2010 Watson, Jr.
7,790,946 B2 9/2010 Mulligan
7,794,438 B2 9/2010 Henley et al.
7,803,980 B2 9/2010 Griffiths et al.
D625,017 S * 10/2010 Iwahashi et al. ..... D24/189
D625,018 S * 10/2010 Smith et al. ..... D24/189
D625,740 S 10/2010 Varini
D625,801 S 10/2010 Pidgeon et al.
7,811,269 B2 10/2010 Boynton et al.
7,815,616 B2 10/2010 Boehringer et al.
7,838,717 B2 11/2010 Haggstrom et al.
D629,502 S 12/2010 Au et al.
D630,313 S 1/2011 Pidgeon et al.
D630,725 S 1/2011 Pidgeon et al.
D631,166 S * 1/2011 Leffew et al. ..... D24/189
7,880,050 B2 2/2011 Robinson et al.
7,896,823 B2 3/2011 Mangrum et al.
7,896,856 B2 3/2011 Petrosenko et al.
7,922,703 B2 4/2011 Riesinger
7,951,100 B2 5/2011 Hunt et al.
D639,441 S 6/2011 Sferle
7,959,624 B2 6/2011 Riesinger
7,964,766 B2 6/2011 Blott et al.
7,976,519 B2 7/2011 Bubb et al.
D642,594 S 8/2011 Mattson et al.
D644,318 S 8/2011 MacDonald et al.
D644,330 S 8/2011 Pfeiffer et al.
8,007,481 B2 8/2011 Schuessler et al.
D645,137 S 9/2011 Gonzalez
D648,353 S 11/2011 Mattson et al.
D650,894 S 12/2011 Gonzalez
8,080,702 B2 12/2011 Blott et al.
RE43,195 E 2/2012 Cotton
D654,095 S 2/2012 Mattson et al.
8,152,785 B2 4/2012 Vitaris
8,158,844 B2 4/2012 McNeil
D659,717 S 5/2012 Mattson et al.
D661,188 S 6/2012 Fahy
D661,189 S 6/2012 Fahy
D661,190 S 6/2012 Fahy
8,192,409 B2 6/2012 Hardman et al.
8,240,470 B2 8/2012 Pidgeon et al.
8,267,908 B2 9/2012 Coulthard
8,298,200 B2 10/2012 Vess et al.
8,361,043 B2 * 1/2013 Hu ..... A61F 13/0203 604/319
8,372,049 B2 2/2013 Jaeb et al.
D679,819 S * 4/2013 Peron ..... D24/189
D679,820 S * 4/2013 Peron ..... D24/189
8,409,157 B2 4/2013 Haggstrom et al.
8,444,612 B2 5/2013 Patel et al.
8,540,699 B2 9/2013 Miller et al.
D692,565 S 10/2013 Lattimore et al.
8,680,360 B2 3/2014 Greener et al.
D705,428 S * 5/2014 Cheney ..... D24/169
D705,429 S * 5/2014 Cheney ..... D24/169
8,715,256 B2 5/2014 Greener
8,764,732 B2 7/2014 Hartwell
8,791,315 B2 7/2014 Lattimore et al.
8,801,685 B2 8/2014 Armstrong et al.
8,808,274 B2 8/2014 Hartwell
D713,967 S * 9/2014 Adoni ..... D24/189
8,864,748 B2 10/2014 Coulthard et al.
8,905,985 B2 12/2014 Allen et al.
8,951,235 B2 2/2015 Allen et al.
9,061,095 B2 6/2015 Adie et al.
RE45,864 E 1/2016 Peron
RE46,289 E 1/2017 Peron
9,770,368 B2 9/2017 Robinson et al.
RE46,778 E 4/2018 Peron
RE47,644 E 10/2019 Peron
RE47,645 E 10/2019 Peron
2001/0027285 A1 10/2001 Heinecke et al.
2002/0002209 A1 1/2002 Mork
2003/0219469 A1 11/2003 Johnson et al.
2004/0064111 A1 4/2004 Lockwood et al.
2004/0167482 A1 8/2004 Watson
2004/0241214 A1 12/2004 Kirkwood et al.
2005/0113733 A1 5/2005 Liedtke et al.
2005/0131327 A1 6/2005 Lockwood et al.
2005/0143697 A1 6/2005 Riesinger
2005/0181163 A1 8/2005 Kose
2006/0009744 A1 1/2006 Erdman et al.
2006/0142687 A1 6/2006 Liedtke et al.
2006/0178608 A1 8/2006 Stapf
2006/0241689 A1 10/2006 Leiboff et al.
2007/0142761 A1 6/2007 Aali
2007/0276195 A1 11/2007 Xu et al.
2007/0276309 A1 11/2007 Xu et al.
2008/0033400 A1 2/2008 Holper et al.
2008/0071216 A1 3/2008 Locke et al.
2008/0095979 A1 4/2008 Hatanaka et al.
2008/0167593 A1 7/2008 Fleischmann
2008/0213344 A1 9/2008 McCarthy et al.
2008/0300555 A1 12/2008 Olson et al.
2009/0099519 A1 4/2009 Kaplan
2009/0130186 A1 5/2009 McCarthy et al.
2009/0177136 A1 7/2009 Liedtke et al.
2009/0223989 A1 9/2009 Gelardi
2009/0227969 A1 9/2009 Jaeb et al.
2009/0240185 A1 9/2009 Jaeb et al.
2009/0240218 A1 9/2009 Braga et al.
2009/0275872 A1 11/2009 Addison et al.
2009/0281471 A1 * 11/2009 Iwahashi et al. ..... 602/54
2009/0293887 A1 12/2009 Wilkes et al.
2009/0299251 A1 12/2009 Buan
2009/0299306 A1 12/2009 Buan
2009/0299340 A1 12/2009 Kazala et al.
2009/0299341 A1 12/2009 Kazala et al.
2009/0312728 A1 12/2009 Randolph et al.
2010/0069829 A1 3/2010 Hutchinson et al.
2010/0069850 A1 3/2010 Fabo
2010/0069858 A1 3/2010 Olson
2010/0069863 A1 3/2010 Olson
2010/0069885 A1 3/2010 Stevenson et al.
2010/0094234 A1 4/2010 Ramella et al.
2010/0106112 A1 4/2010 Vogel
2010/0106117 A1 4/2010 Lockwood et al.
2010/0121286 A1 5/2010 Locke et al.
2010/0122417 A1 5/2010 Vrzalik et al.
2010/0125258 A1 5/2010 Coulthard et al.
2010/0125259 A1 5/2010 Olson
2010/0160901 A1 6/2010 Hu et al.
2010/0191198 A1 7/2010 Heagle
2010/0210986 A1 8/2010 Sanders
2010/0228205 A1 9/2010 Hu et al.
2010/0230467 A1 9/2010 Crisuolo et al.
2010/0262090 A1 10/2010 Riesinger
2010/0262091 A1 10/2010 Larsson
2010/0268176 A1 10/2010 Johnson et al.
2010/0268198 A1 10/2010 Buan et al.
2010/0305490 A1 12/2010 Coulthard et al.
2010/0305526 A1 12/2010 Robinson et al.
2010/0305549 A1 12/2010 Miller et al.
2010/0324510 A1 12/2010 Anderson et al.
2010/0324516 A1 12/2010 Braga et al.
2011/0004172 A1 1/2011 Eckstein et al.
2011/0028918 A1 2/2011 Hartwell
2011/0028919 A1 2/2011 Johnnison et al.

| | | | |
|---|---|---|---|
| 2011/0054421 | A1 | 3/2011 | Hartwell |
| 2011/0054423 | A1 | 3/2011 | Blott et al. |
| 2011/0087179 | A2 | 4/2011 | Blott et al. |
| 2011/0092927 | A1 | 4/2011 | Wilkes et al. |
| 2011/0106030 | A1 | 5/2011 | Scholz |
| 2011/0112492 | A1 | 5/2011 | Bharti et al. |
| 2011/0172615 | A2 | 7/2011 | Greener |
| 2014/0343520 | A1 | 11/2014 | Bennett et al. |

FOREIGN PATENT DOCUMENTS

| | | | |
|---|---|---|---|
| DE | 3 539 533 | | 5/1987 |
| DE | 20 2005 019 670 | | 4/2006 |
| EP | 0 122 085 | | 6/1987 |
| EP | 0 418 607 | | 3/1991 |
| EP | 0 485 657 | | 5/1992 |
| EP | 0 617 938 | | 10/1994 |
| EP | 0 619 105 | | 10/1994 |
| EP | 0619105 | A1 | 10/1994 |
| EP | 0 638 301 | | 2/1995 |
| EP | 0 670 705 | | 9/1995 |
| EP | 0 762 860 | | 12/1997 |
| EP | 0 853 950 | | 7/1998 |
| EP | 0 651 983 | | 9/1998 |
| EP | 0 875 222 | | 7/2002 |
| EP | 1 219 311 | | 7/2004 |
| EP | 1 488 816 | | 12/2004 |
| EP | 1 440 667 | | 3/2006 |
| EP | 1 284 777 | | 4/2006 |
| EP | 0 620 720 | | 11/2006 |
| EP | 1 923 077 | | 11/2006 |
| EP | 1 772 160 | | 4/2007 |
| EP | 2 098 257 | | 9/2009 |
| EP | 2098257 | A1 | 9/2009 |
| EP | 2 111 804 | | 10/2009 |
| EP | 2 218 431 | | 8/2010 |
| EP | 2 335 749 | | 6/2011 |
| EP | 2335749 | A1 | 6/2011 |
| FR | 1 163 907 | | 10/1958 |
| GB | 1063066 | | 3/1967 |
| GB | 2085305 | | 1/1985 |
| GB | 2305610 | | 4/1997 |
| GB | 2329127 | | 3/1999 |
| GB | 2357286 | | 11/2003 |
| GB | 2389794 | | 12/2003 |
| GB | 2423019 | | 8/2006 |
| GB | 4 017 441 | | 10/2010 |
| GB | 4 017 442 | | 10/2010 |
| GB | 4 017 443 | | 10/2010 |
| GB | 4 017 444 | | 10/2010 |
| WO | WO 1990/011795 | | 10/1990 |
| WO | WO 1992/013713 | | 8/1992 |
| WO | WO 1993/000056 | | 1/1993 |
| WO | WO 1996/024316 | | 8/1996 |
| WO | WO 1997/043991 | | 11/1997 |
| WO | WO 1998/038955 | | 9/1998 |
| WO | WO 99/01173 | A1 | 1/1999 |
| WO | WO 1999/01173 | | 1/1999 |
| WO | WO 2000/061206 | | 10/2000 |
| WO | WO 2001/049233 | | 7/2001 |
| WO | WO 01/85248 | A1 | 11/2001 |
| WO | WO 2001/085248 | | 11/2001 |
| WO | WO 2002/005737 | | 1/2002 |
| WO | WO 2002/026180 | | 4/2002 |
| WO | WO 2002/039940 | | 5/2002 |
| WO | WO 2002/041878 | | 5/2002 |
| WO | WO 2002/045761 | | 6/2002 |
| WO | WO 2002/070040 | | 9/2002 |
| WO | WO 2002/091965 | | 11/2002 |
| WO | WO 2003/074100 | | 9/2003 |
| WO | WO 2003/092620 | | 11/2003 |
| WO | WO 2004/018020 | | 3/2004 |
| WO | WO 2006/048246 | | 5/2006 |
| WO | WO 2006/130594 | | 12/2006 |
| WO | WO 2007/030599 | | 3/2007 |
| WO | WO 2007/075379 | | 7/2007 |
| WO | WO 2008/036345 | | 3/2008 |
| WO | WO 2008/039839 | | 4/2008 |
| WO | WO 2008/041926 | | 4/2008 |
| WO | WO 2008/064503 | | 6/2008 |
| WO | WO 2008/104609 | | 9/2008 |
| WO | WO 2008/112304 | | 9/2008 |
| WO | WO 2008/141228 | | 11/2008 |
| WO | WO 2008/141470 | | 11/2008 |
| WO | WO 2009/011856 | | 1/2009 |
| WO | WO 2009/019227 | | 2/2009 |
| WO | WO 2009/019229 | | 2/2009 |
| WO | WO 2009/034322 | | 3/2009 |
| WO | WO 2009/047524 | | 4/2009 |
| WO | WO 2009/062327 | | 5/2009 |
| WO | WO 2009/070905 | | 6/2009 |
| WO | WO 2009/078790 | | 6/2009 |
| WO | WO 2009/103031 | | 8/2009 |
| WO | WO 2009/111657 | | 9/2009 |
| WO | WO 2009/126103 | | 10/2009 |
| WO | WO 2009/126833 | | 10/2009 |
| WO | WO 2009/145703 | | 12/2009 |
| WO | WO 2009/158126 | | 12/2009 |
| WO | WO 2010/033574 | | 3/2010 |
| WO | WO 2010/033574 | A1 | 3/2010 |
| WO | WO 2010/033613 | | 3/2010 |
| WO | WO 2010/035017 | | 4/2010 |
| WO | WO 2010/042240 | | 4/2010 |
| WO | WO 2010/051068 | | 5/2010 |
| WO | WO 2010/051073 | | 5/2010 |
| WO | WO 2010/059849 | | 5/2010 |
| WO | WO 2010/072309 | | 7/2010 |
| WO | WO 2010/072349 | | 7/2010 |
| WO | WO 2010/072395 | | 7/2010 |
| WO | WO 2010/075313 | | 7/2010 |
| WO | WO 2010/083135 | | 7/2010 |
| WO | WO 2010/085270 | | 7/2010 |
| WO | WO 2010/118316 | | 10/2010 |
| WO | WO 2010/147533 | | 12/2010 |
| WO | WO 2010/147533 | A1 | 12/2010 |
| WO | WO 2011/019476 | | 2/2011 |
| WO | WO 2011/019476 | A1 | 2/2011 |
| WO | WO 2011/023275 | | 3/2011 |
| WO | WO 2011/023275 | A1 | 3/2011 |

OTHER PUBLICATIONS

Thomas, S. et al., "Hydrocolloids: A guide to composition, properties and uses of hydrocolloid dressings and the commercial presentations available," J. of Wound Care, vol. 1, No. 2, Jul.-Aug. 1992, pp. 27-30, in 5 pages.

ArjoHuntleigh, WoundAssist® Topical Negative Pressure System, retrieved on Jul. 22, 2011, information posted on the website before the priority date of the present application, in 1 page. URL: http://www.easytnp.com/Page.asp?PageNumber=14.

Bagautdinov, N.A., "Variant of External Vacuum Aspiration in the Treatment of Purulent Diseases of Soft Tissues", Current Problems in Modern Clinical Surgery—Interdepartmental Collection, edited by V. Ye. Volkov et al. (Chuvash State University, Cheboksary, USSR 1986), pp. 94-96, in 8 pages.

Barker, D. et al., "Vacuum Pack Technique of Temporary Abdominal Closure: A 7-Year Experience with 112 Patients", Journ. of Trauma: Injury and Critical Care, Feb. 2000, vol. 48 No. 2, pp. 201-207, in 7 pages.

Brock, W.B. et al., "Temporary closure of open abdominal wounds: the vacuum pack", The American Surgeon, Jan. 1995, vol. 61(1), pp. 30-35, abstract, in 6 pages.

Fleischmann, W. et al. "Vacuum Sealing for Treatment of Soft Tissue Injury in Open Fractures," Emergency Surgery (1993), vol. 96, pp. 488-492, in 5 pages.

Garner, G. et al., "Vacuum-assisted wound closure provides early fascial reapproximation in trauma patients with open abdomens," Am. J. of Surgery, vol. 182 (2001), pp. 630-638, in 9 pages.

Harris, D., "A new technique of skin grafting using Stei-Greffe and a self-adhering foam pad," Brit. J. of Plastic Surg., vol. 34, No. 2, Apr. 1981, pp. 181-185, in 6 pages.

Jeter, K. et al., "Managing Draining Wounds and Fistulae: New and Established Methods", Chronic Wound Care, 1990, pp. 240-246, in 7 pages.

Kalypto Medical, NPD 1000 NPWT Pump & Control Module Product Specifications, Oct. 2009, in 2 pages.
Kalypto Medical, NPD 1000™ Negative Pressure Wound Therapy System, Jun. 2011, in 4 pages. Retrieved from http://www.kalyptomedical.com/pdf/50089RevB_Kalypto_NPD_1OOO_Bro_final.pdf.
KCI Licensing, "V.A.C. Abdominal Dressing System Advanced Management of the Open Abdomen," 2004, in 6 pages.
KCI, Packaging for V.A.C. ViaTM Negative Pressure Wound Therapy System, on sale in the United States before the priority date of the present application.
Navsaria, P.H. et al., "Temporary closure of open abdominal wounds by the modified sandwich-vacuum pack technique", British Journal of Surgery, 2003, vol. 90, pp. 718-722, in 8 pages.
Nicholas, J.M., "Options for Management of the Open Abdomen", Presentation from Emory University School of Medicine, Invited Speaker American College of Surgeons 32nd Annual Spring Meeting, General Session 12—Presentation and Panel Discussion on The Open Abdomen in General Surgery—How Do You Close the Abdomen When You Can't—Boston Marriott Copley Place Hotel, Boston, MA Apr. 26, 2004, in 66 pages.
Orgill, D.P. et al., "Guidelines for Treatment of Complex Chest Wounds with Negative Pressure Wound Therapy", Wounds, A Compendium of Clinical Research and Practice, Suppl. B, Dec. 2004, pp. 1-23, in 26 pages.
Schein, M. et al., "The 'Sandwich Technique' in the Management of the Open Abdomen," British Journal of Surgery, 1986, vol. 73, May 1986, pp. 369-370, in 2 pages.
Smith, L. et al., "Vacuum Pack Technique of Temporary Abdominal Closure: A Four-Year Experience", The American Surgeon, vol. 63(12), Dec. 1997, pp. 1102-1108, in 7 pages.
Smith & Nephew, Blister Pack Tray for Versajet Hydrosurgery System Handpiece (used for debridement of wounds), on sale in the United States more than one year before the priority date of the present application.
Solovev, V. A., "Treatment and Prevention of Suture Failures after Gastric Resection", Dissertation Abstract, S.M. Kirov Gorky State Medical Institute, USSR, 1988, in 51 pages.
Web page labeled "The XVS System," printed from Cerulean Medical website, available before Oct. 14, 2010, in 1 page. URL: http://ceruleanmedical.com/Cerulean_Medical/The_XVS_System.html.
Allevyn Educational Booklet, Smith & Nephew Medical Ltd, Apr. 2014.
Allevyn Wound Dressings Pamphlet, Smith & Nephew, Inc., 2008.
KCI Licensing, Prevena™ Incision Management System, Jan. 2010, in 2 pages.
KCI, Prevena™ Incision Management System Clinician Guide, Jan. 2010.
KCI Licensing, Prevena™ Incision Management System Patient Guide, Jan. 2010, in 4 pages.
Teder, H. et al., "Continuous Wound Irrigation in the Pig," Journal of Investigative Surgery, vol. 3, 1990, pp. 399-407, in 9 pages.
US. Appl. No. 29/389,782, filed Apr. 15, 2011, Peron.
U.S. Appl. No. 13/092,042, filed Apr. 21, 2011.

* cited by examiner

*Primary Examiner* — Darlington Ly

(74) *Attorney, Agent, or Firm* — Knobbe, Martens, Olson & Bear, LLP

(57) CLAIM

The ornamental design for a medical dressing, as shown and described.

DESCRIPTION

*The present application is a continuation reissue application of U.S. Reissue application Ser. No. 29/639,290, which is a continuation reissue application of U.S. Reissue application Ser. No. 29/548,270, which is a divisional reissue application of U.S. Reissue application Ser. No. 29/510,717, filed Dec. 2, 2014, which is an application for reissue of U.S. Des. Pat. No. 679,820, filed Apr. 15, 2011, which claims priority to United Kingdom Design Registration No. 4017442, filed Oct. 15, 2010, and United Kingdom Design Registration No. 4017443, filed Oct. 15, 2010.*

*FIG. 9 is a top, right-side, and front perspective view of a medical dressing.*

*FIG. 10 is a top, right-side, and rear perspective top view of the medical dressing of FIG. 9.*

*FIG. 11 is a top plan view of the medical dressing of FIG. 9.*

*FIG. 12 is a bottom plan view of the medical dressing of FIG. 9.*

*FIG. 13 is a left side elevation view of the medical dressing of FIG. 9.*

*FIG. 14 is a right side elevation view of the medical dressing of FIG. 9.*

*FIG. 15 is a front elevation view of the medical dressing of FIG. 9; and,*

*FIG. 16 is a rear elevation view of the medical dressing of FIG. 9.*

Figure 1:
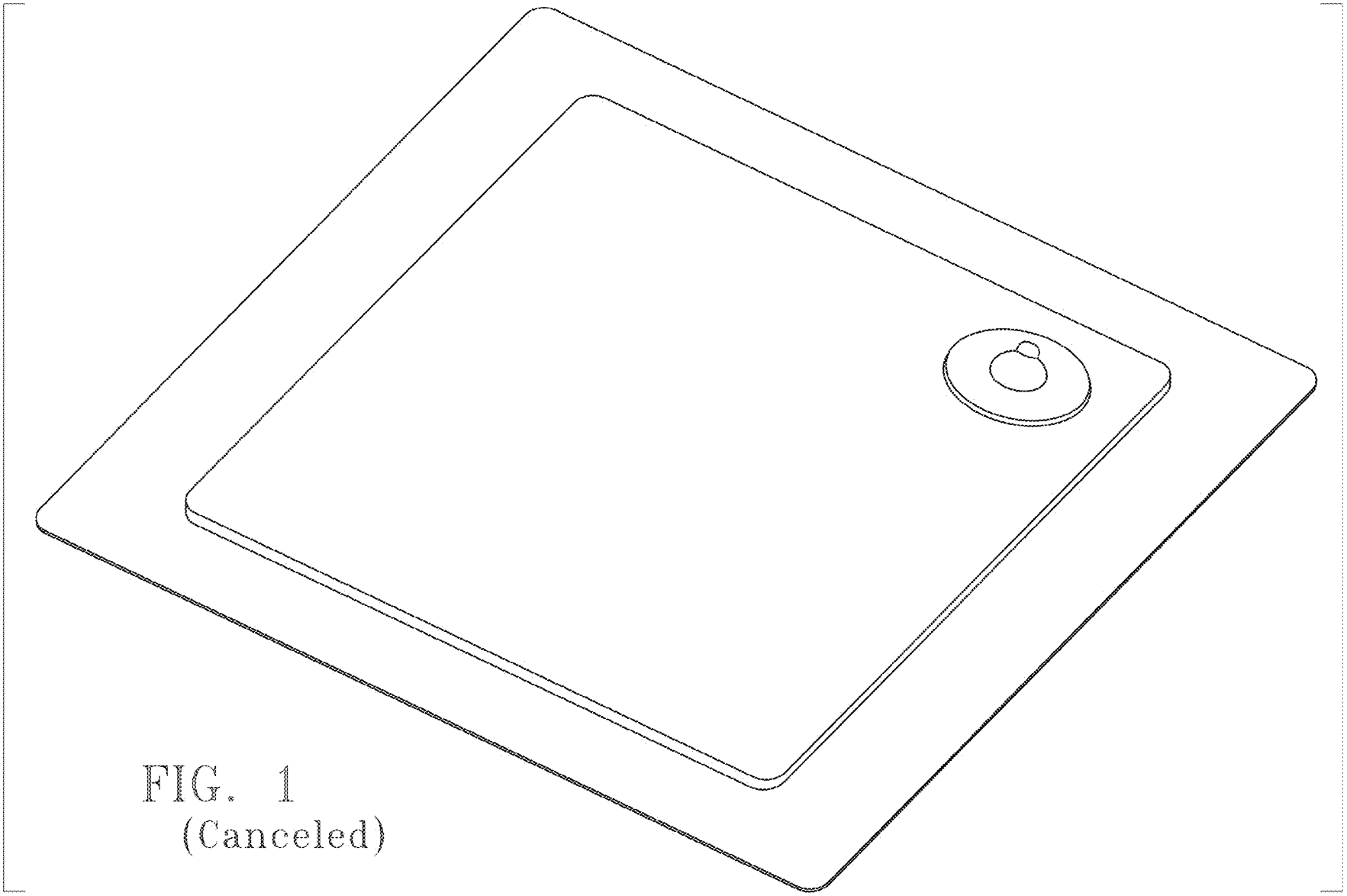
[FIG. 1 is a perspective top view of one embodiment of a medical dressing.]
Figure 2:
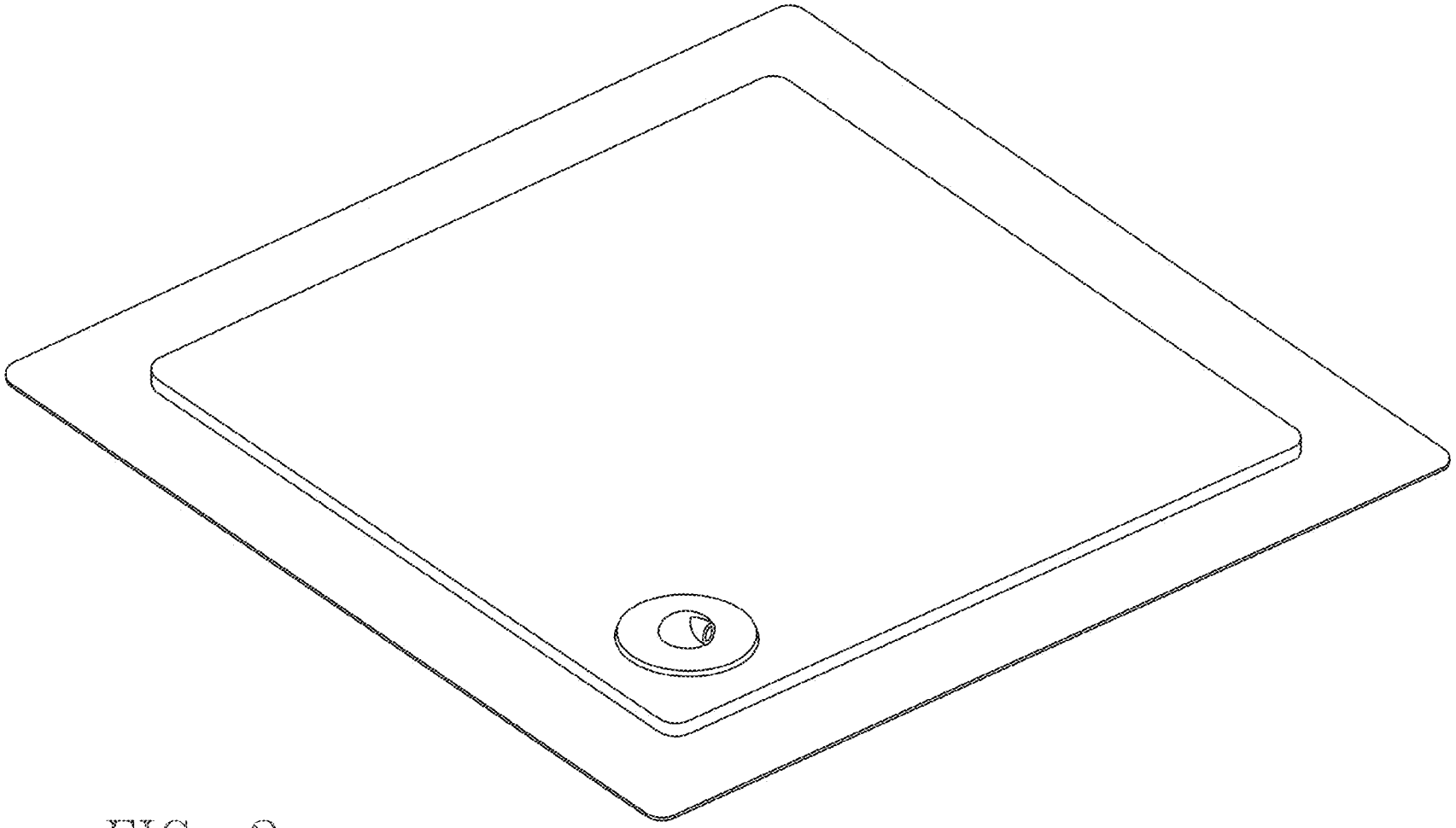
[FIG. 2 is another perspective top view of the medical dressing of FIG. 1.]
Figure 3:
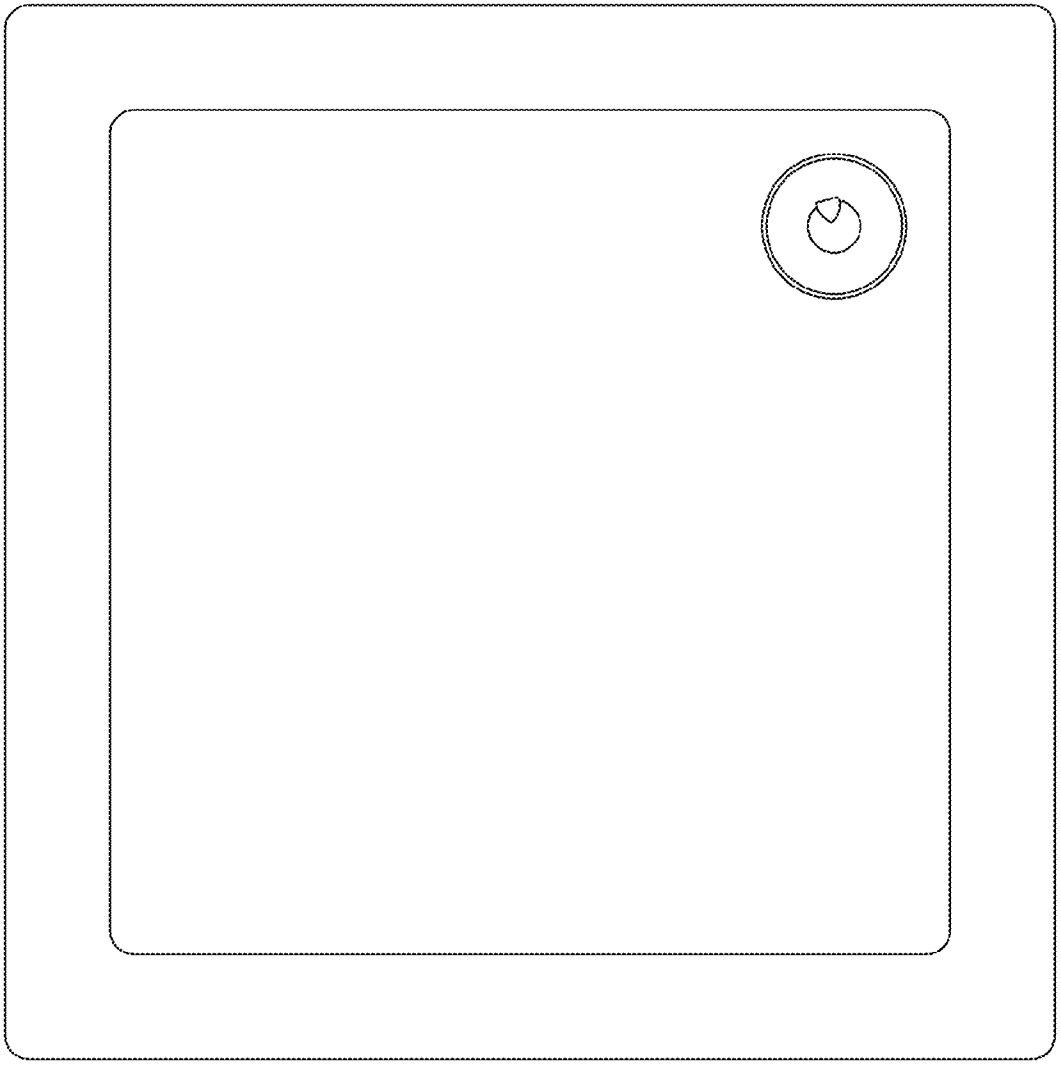
[FIG. 3 is a top plan view of the medical dressing of FIG. 1.]
Figure 4:
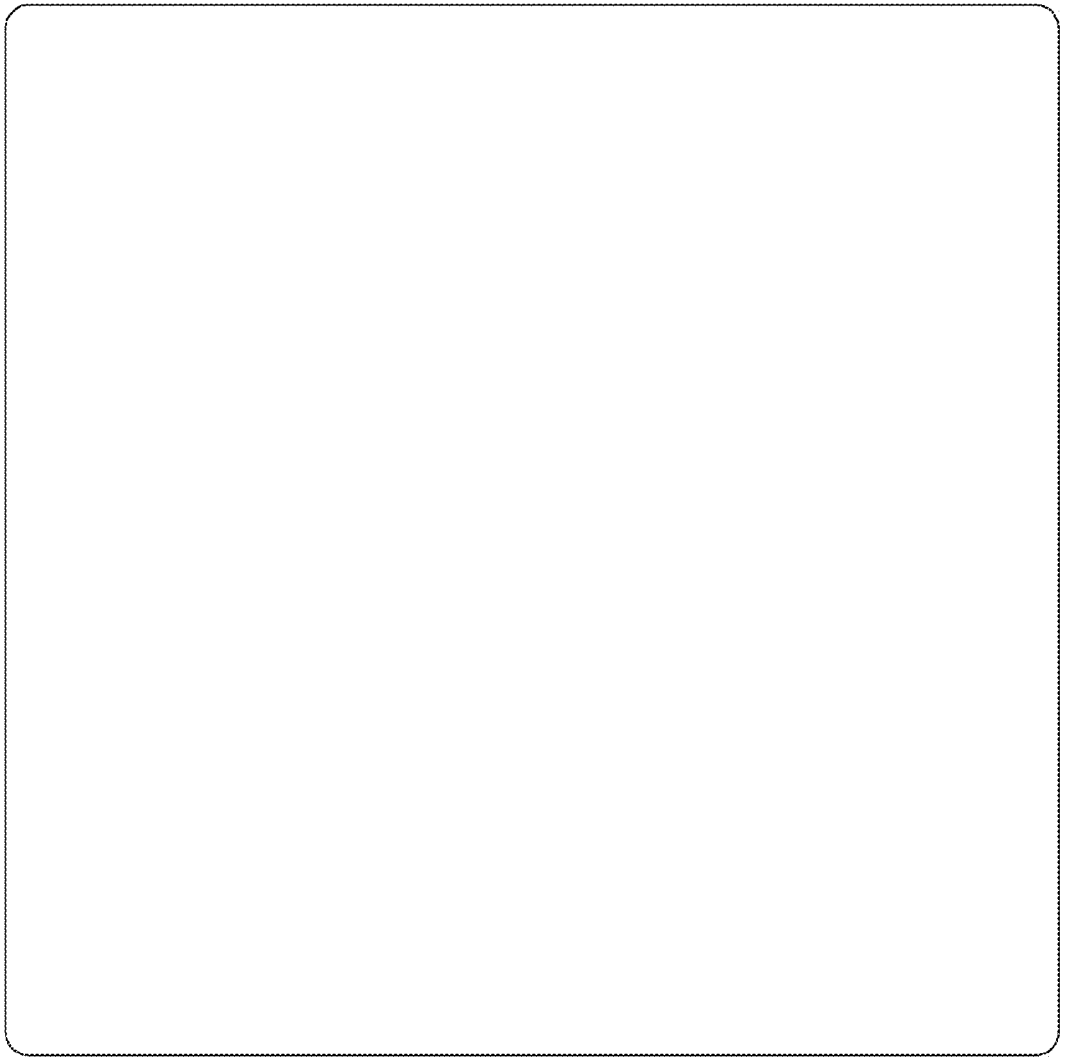
[FIG. 4 is a bottom view of the medical dressing of FIG. 1.]
Figure 5:
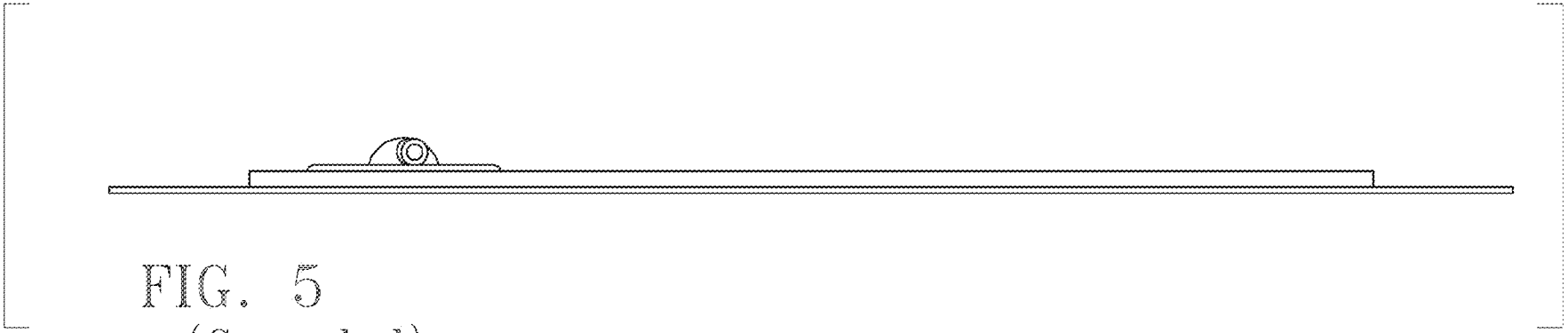
[FIG. 5 is a far side view of the medical dressing of FIG. 1.]
Figure 6:
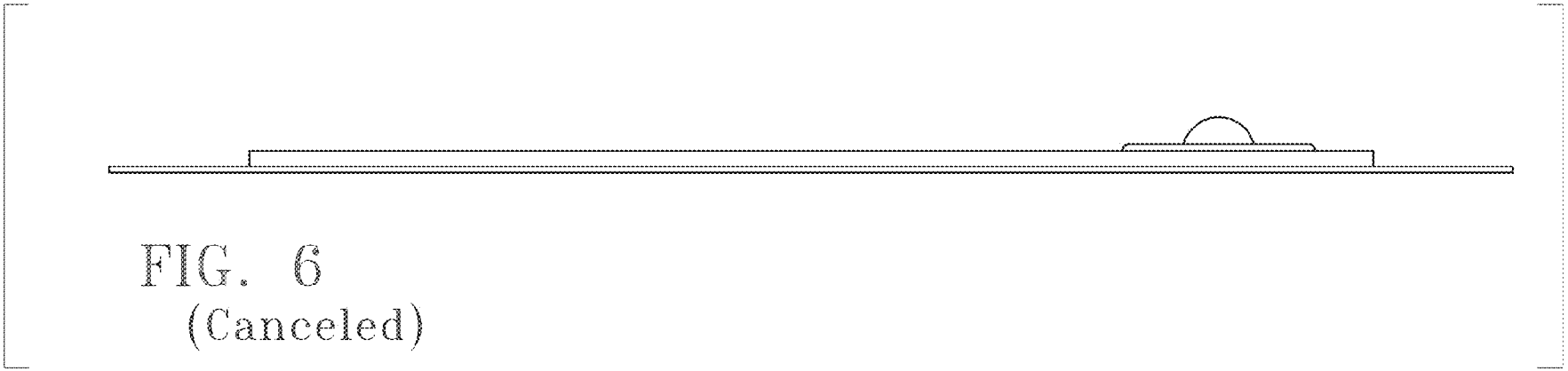
[FIG. 6 is near side view of the medical dressing of FIG. 1.]
Figure 7:
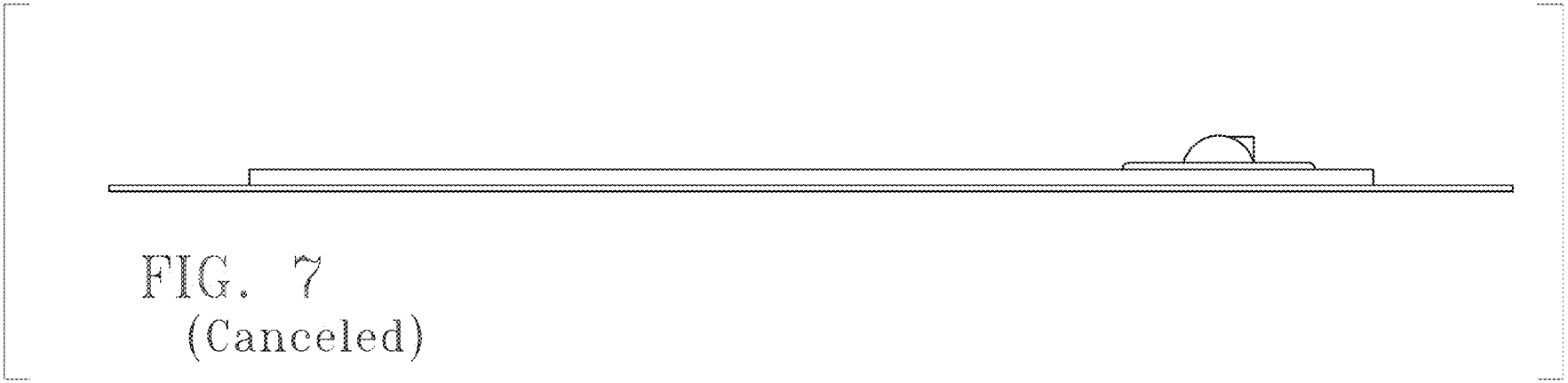
[FIG. 7 is a front view of the medical dressing of FIG. 1; and,]
Figure 8:
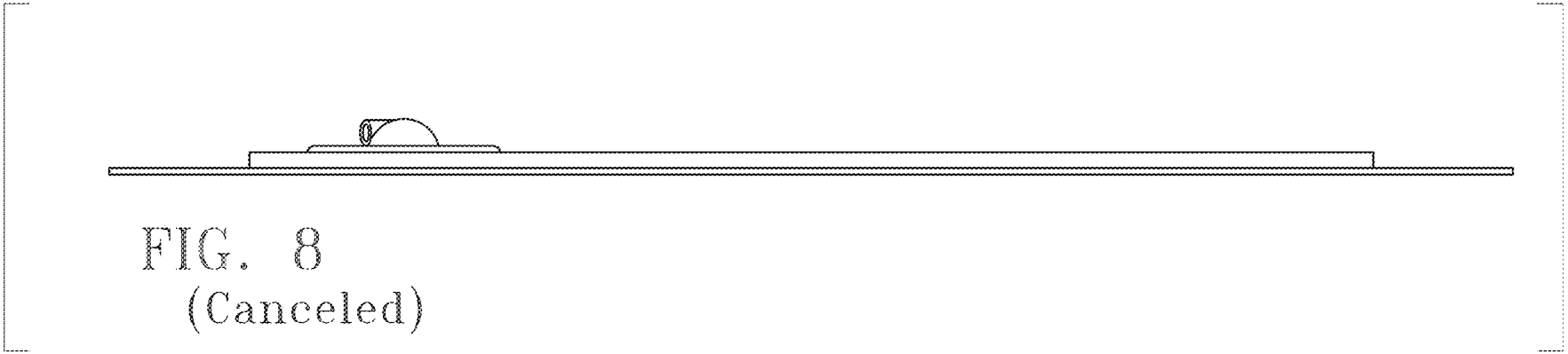
[FIG. 8 is a rear view of the medical dressing of FIG. 1.]

*The broken lines in the drawings illustrate portions of the medical dressing that form no part of the claimed design.*

1 Claim, 16 Drawing Sheets

Matter enclosed in heavy brackets [ ] appears in the original patent but forms no part of this reissue; matter printed in italics indicates the additions made by reissue.

(Canceled)

(Canceled)

(Canceled)

(Canceled)

(Canceled)

(Canceled)

(Canceled)

(Canceled)

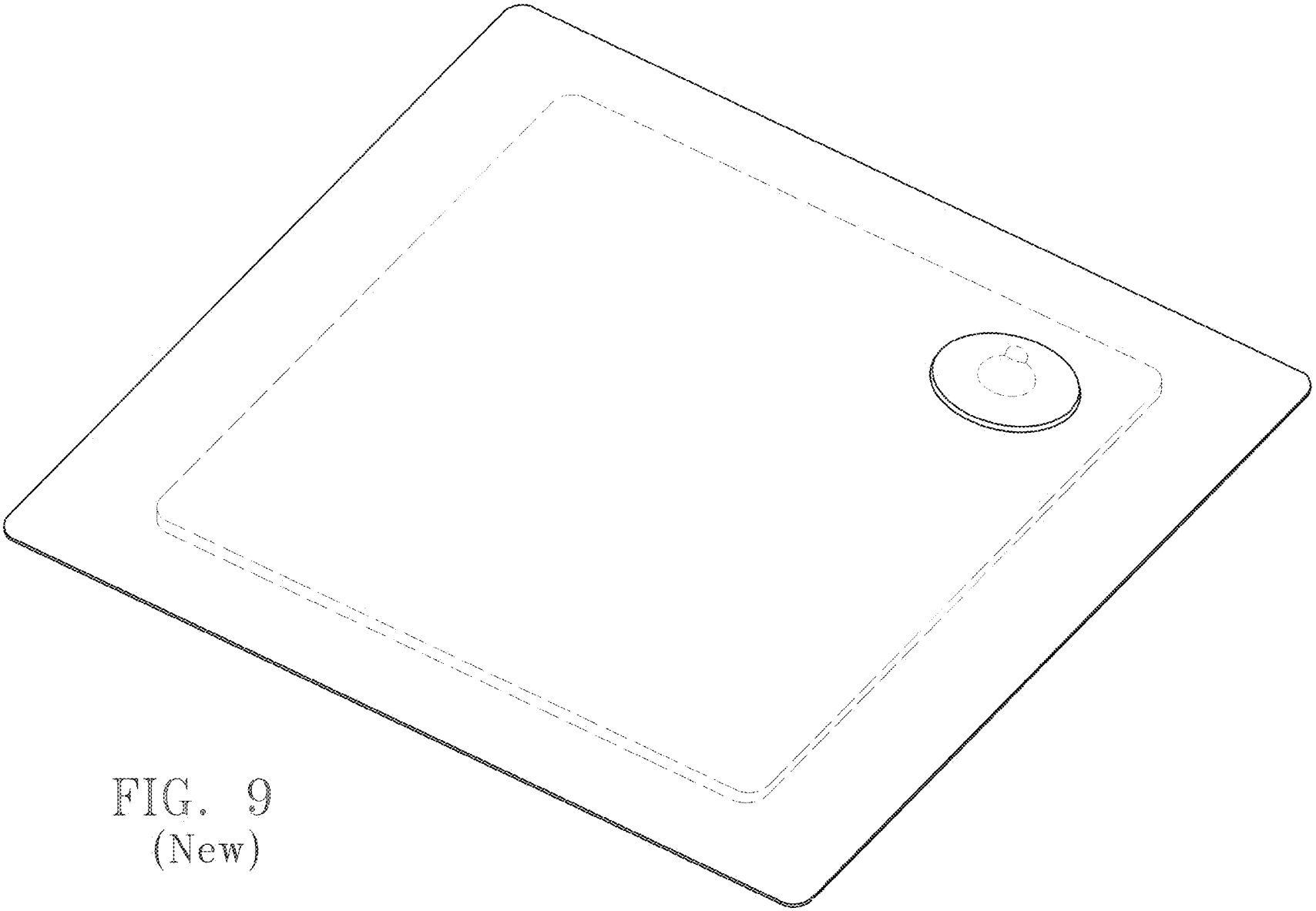
FIG. 9
(New)

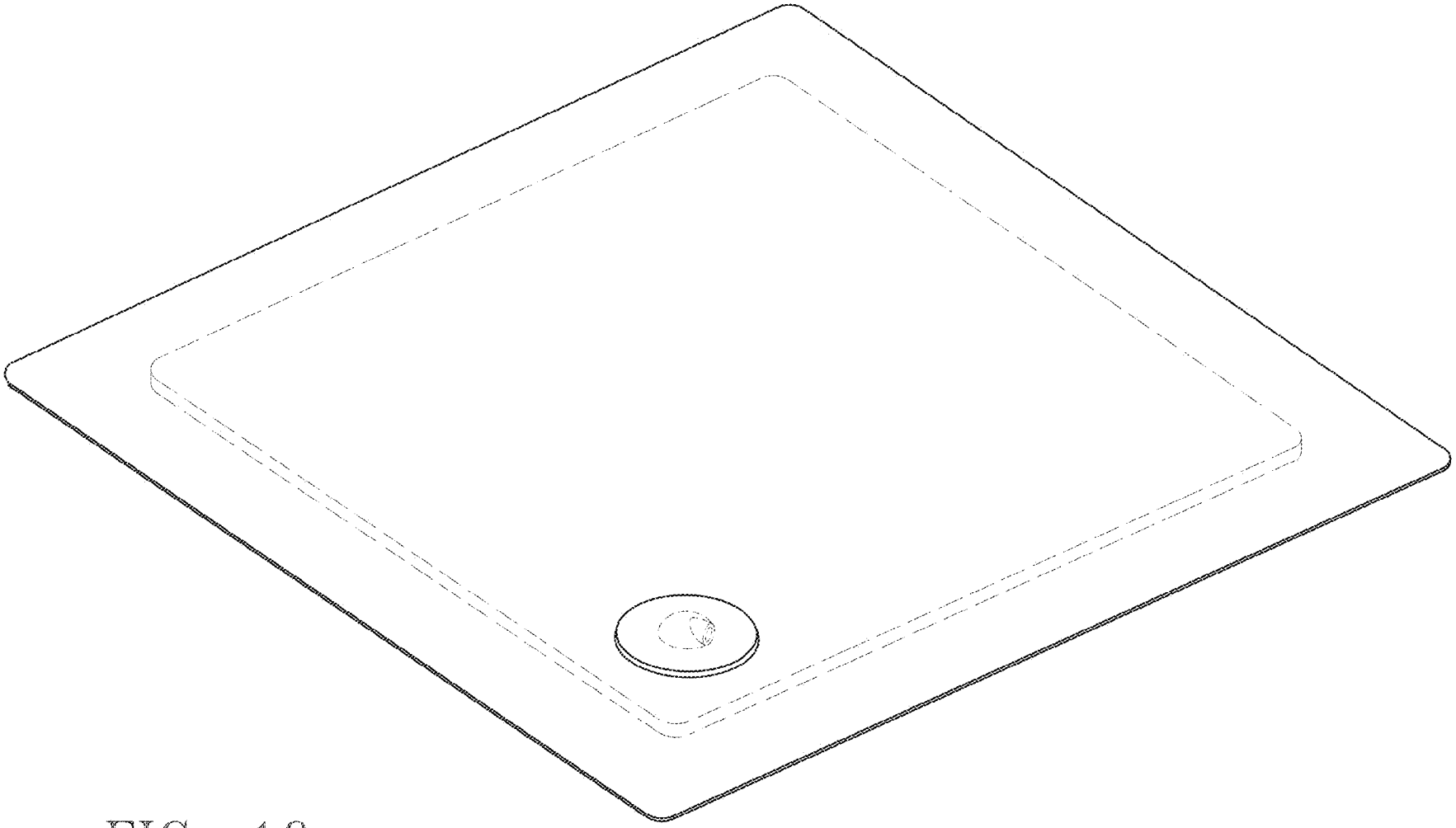
FIG. 10
(New)

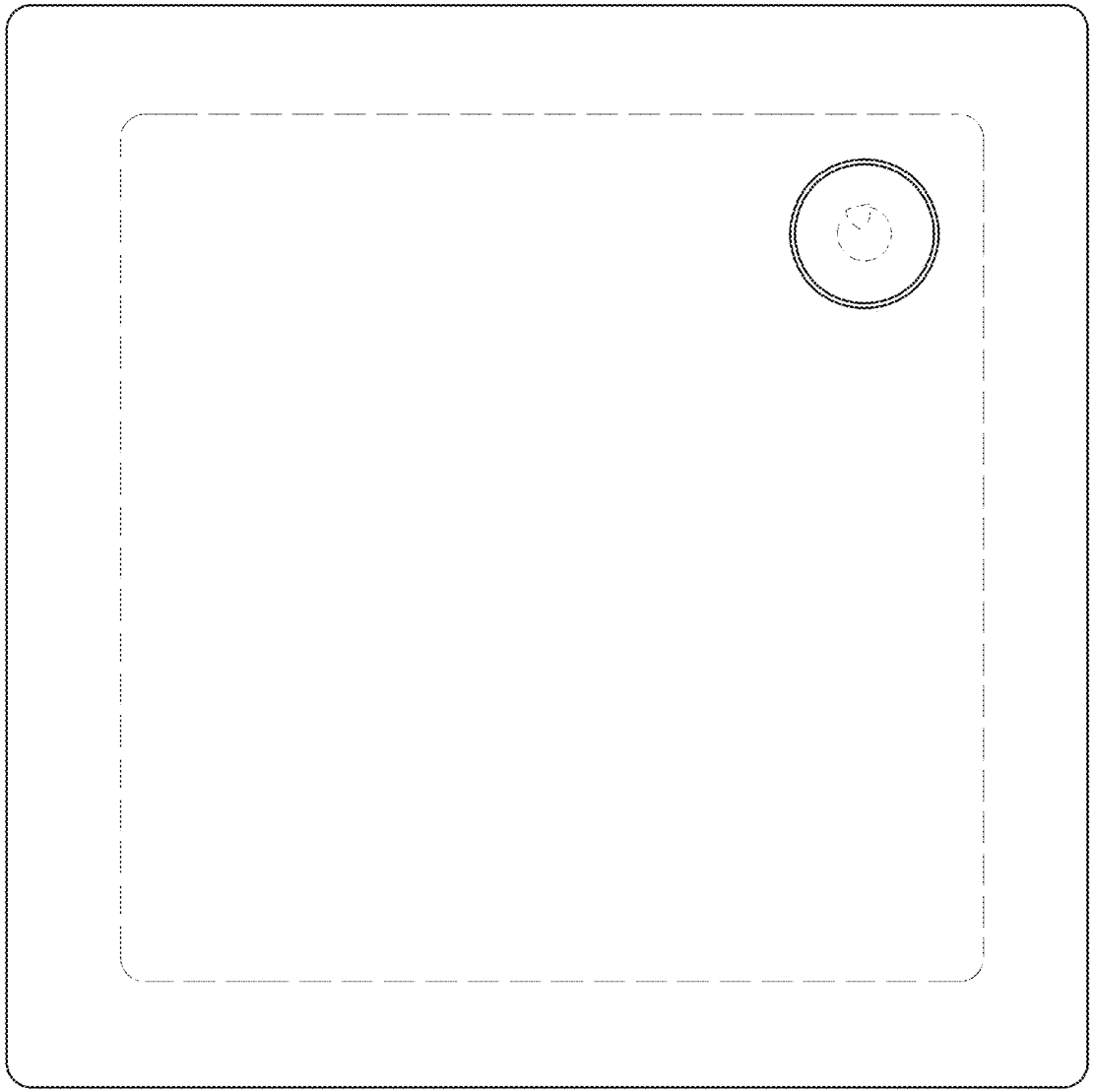
FIG. 11
(New)

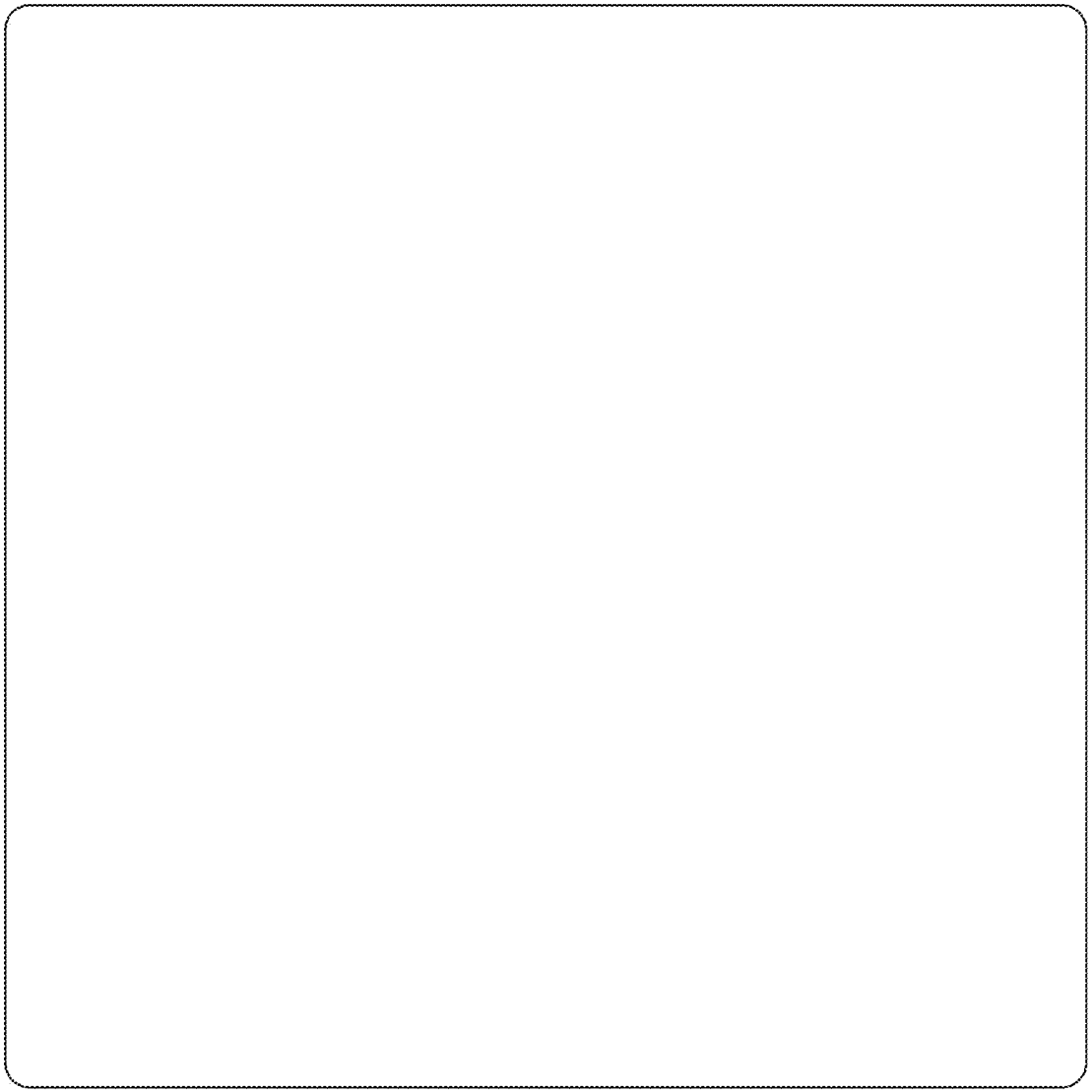
FIG. 12
(New)

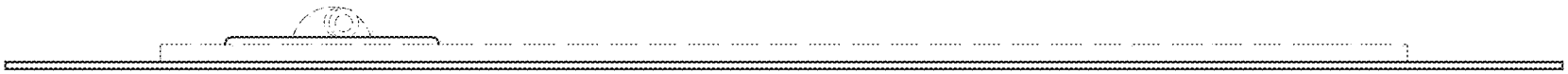
FIG. 13
(New)

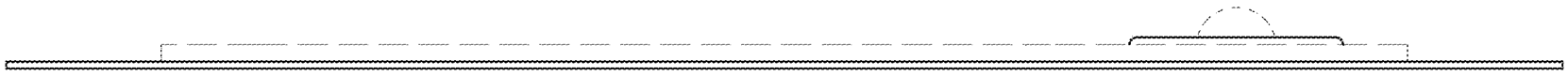
FIG. 14
(New)

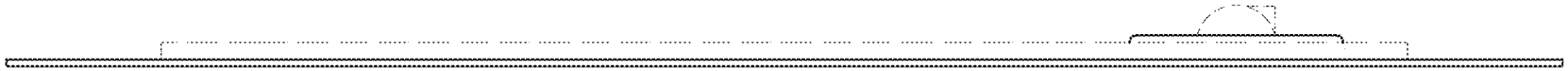
FIG. 15
(New)

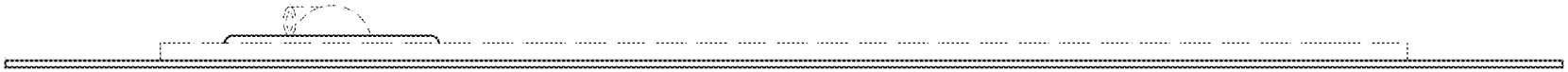
FIG. 16
(New)